INVENTOR
ROBERT L. LYON

BY
AGENT

BALANCING NETWORK

United States Patent Office 2,995,702
Patented Aug. 8, 1961

---

2,995,702
PULSING OF HALL PROBES
Robert L. Lyon, Endicott, N.Y., assignor to International Business Machines Corporation, New York, N.Y., a corporation of New York
Filed June 22, 1959, Ser. No. 821,877
7 Claims. (Cl. 324—45)

The invention relates to Hall probes and, more specifically, to the means for pulsing these probes.

The principal object resides in a pulsing technique for Hall-type probes to effect an increase in the output thereof without change in the stability of the probe. Maximum benefit is obtained in the measurement of transient magnetic fields although the pulsing technique may be advantageously employed for the measurement of steady state fields.

The foregoing and other objects, features and advantages of the invention will be apparent from the following more particular description of a preferred embodiment of the invention, as illustrated in the accompanying drawings.

At the present time there are two major areas of application of the Hall probe. One is in the measurement of steady state magnetic fields and transient magnetic fields. The other area is in the detection of the existence of a transient magnetic field in contrast to the measurement of the intensity of a magnetic field to be mapped. Pulse techniques with associated wide band amplifiers are applicable to measurement of transient and steady state magnetic fields. Such techniques are also useful in the increase of the output voltage for all uses of the Hall probe.

Figure 1:
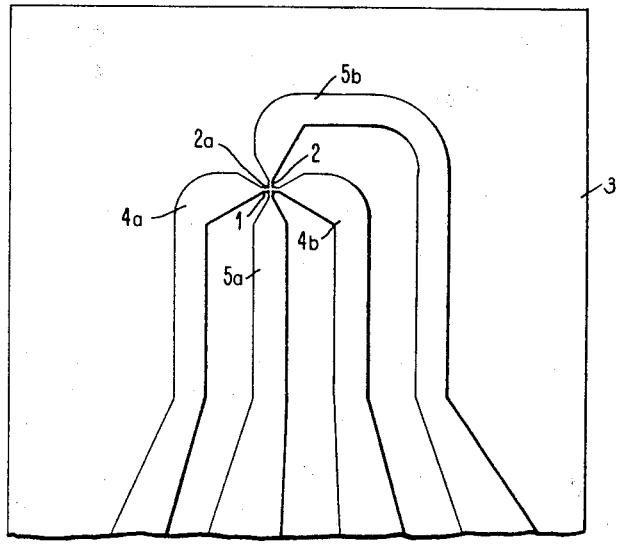
FIG. 1 shows a cross-configured bismuth Hall probe employed in practicing the invention.

Although the pulsing technique may be applied to a variety of Hall-type probes, the technique has been successfully applied to probes of the type which are constituted of a thin layer of a semiconductor material secured to the flat surface of a thin substrate; for example, glass or the like, the sensitive area of the probe lying at the intersection of a cross-configuration, as shown in FIG. 1. The sensitive area of the probe, when subjected to the influence of mutually perpendicular magnetic and electric current forces, provides a Hall output voltage. In accordance with the following expression, $$V_h = \frac{R_h I H}{t}$$

the Hall output voltage $V_h$ is a function of a Hall coefficient $R_h$, which is different for different semiconductors, the intensity of the magnetic field, the current through the probe and the reciprocal of the thickness of the sensitive area. Other types of probes which may be successfully subjected to the pulsing technique are those that are constructed of thin slabs or crystals of such semiconductor materials; for example, bismuth, germanium, and alloys of indium antimonide and indium arsenide.

Although the invention is not limited to any particular type of probe, it has been found that the bismuth-type probe has provided excellent results in both sensitivity and increased Hall output voltage. In practicing the invention, a bismuth evaporated probe has been employed, as seen in FIG. 1. This probe has a cross-shaped configuration comprised of intersecting arms 1 and 2 constituted of a thin layer of bismuth secured to a substrate 3 constituted of glass, or the like. Arms 1 and 2 have integral extensions 4a, 4b and 5a, 5b, respectively. Current is applied to one pair of extensions; for example, 4a, 4b, to produce a Hall voltage across the other pair of extensions; in this instance, 5a, 5b, while the sensitive area 2a is subjected to the influence of a magnetic field. The width across either of the extensions 1 and 2 is of the magnitude of .0007 of an inch, although probes have been made in which the dimensions have been as low as .0004 of an inch. The Hall probes, employed in practicing the invention, of the type employing a bismuth film have resistance values of 7 to 10 ohms.

Figure 2:
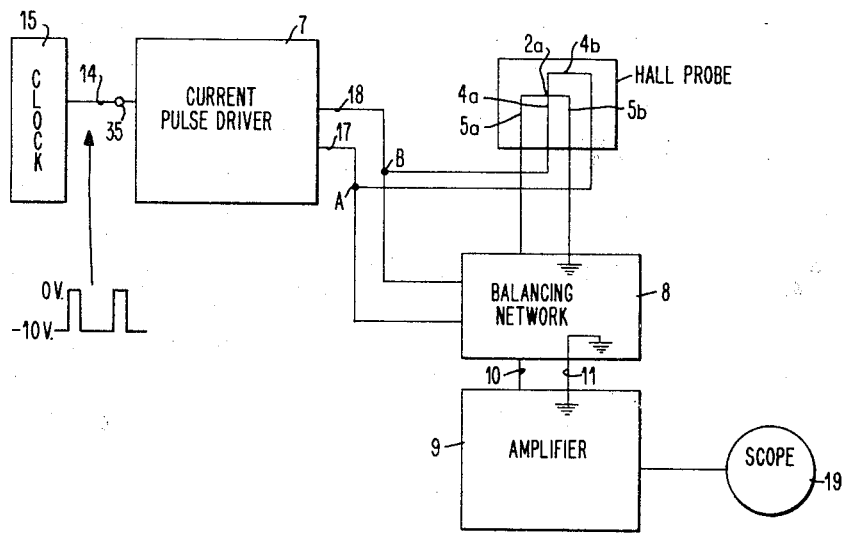
FIG. 2 shows the general arrangement of the instrumentation used with the Hall probe.

The arrangement in FIG. 2 shows how the Hall probe is connected to a current driver 7 by way of lines 17, 18 communicating with the extensions 4a, 4b, and to a balancing network 8 by way of the extensions 5a, 5b. The balancing network 8 in turn is connected to an amplifier 9 by way of connections 10 and 11 and to the current driver 7 by way of lines 12 and 13 connected to terminals A and B. A clock 15 is connected by way of a line 14 to the current driver 7 to supply the latter with pulsating current signals. A scope 19 is connected to the arrangement as a means for observing the voltages developed across the probe.

In the arrangement of FIG. 2 the current driver 7 is designed to provide a pulse amplitude of 1.5 amperes and a pulse width of as low as 6 microseconds. This driver is suitable to drive low impedance Hall probes of resistances of 5 to 20 ohms.

Figure 3:
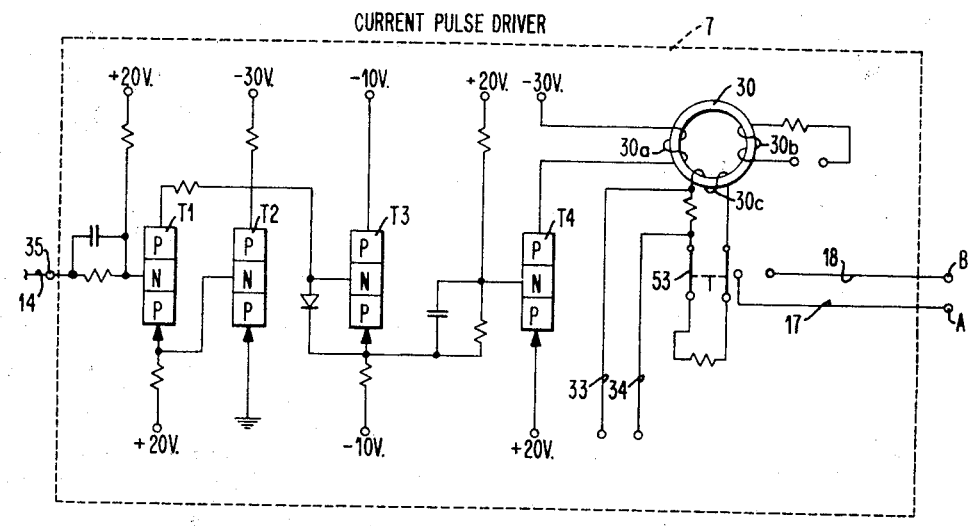
FIG. 3 shows the detail arrangement of a transistorized current pulse driver used in the arrangement of FIG. 2.

Details of the current pulse driver are shown in FIG. 3. This driver is comprised primarily of four transistors; namely, T1, T2, T3 and T4, connected to various voltages in the manner shown. The transistor T4 is connected to a winding 30a wound around a transformer core 30. The latter also has a bias winding 30b and an output winding 30c connected to the Hall probe extensions 4a, 4b by way of a switch S3. Resistor 32 and lines 33, 34 are employed for purposes of calibration. Input to the driver is applied by way of input terminal 35. The transformer core arrangement is employed to provide isolation from a voltage source which would otherwise load up the probe. However, as an alternative, either the amplifier or the driver would have to be provided with a floating power supply.

Figure 4:
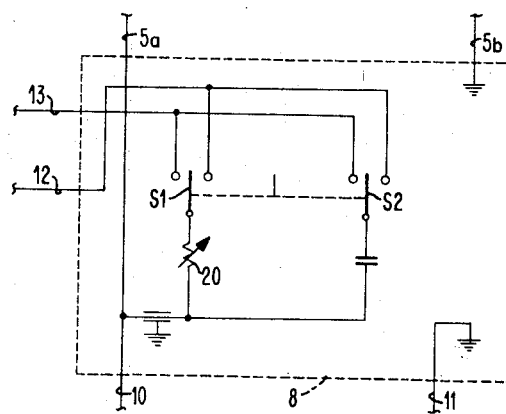
FIG. 4 shows the details of a balancing network used in the arrangement of FIG. 2.

The balancing network 8 shown in FIG. 4 employs a potentiometer 20, capacitor 21, and switches S1 and S2 connected in the manner shown. The switches are set to one of two closing positions depending upon the polarity of the initial voltage that is to be eliminated. The potentiometer 20 and capacitor 21 are adjusted to zeroize the initial voltage.

The balancing network 8 is provided to eliminate an initial voltage across the Hall output terminals that is attributable to geometrical errors in the misalignment of the intersecting arms. This initial voltage is proportional to the current flowing through the probe, the magnitude of which being approximately 1 to 100 millivolts depending upon the magnitude of the probe current.

When the probe is subjected to a magnetic flux of 200 oersteds (substantially the intensity of a data bit on a magnetic tape or drum) and a pulsating current of 1.5 amperes, with a pulse width of 7 microseconds, a frequency of 130 cycles, and a 0.1% duty cycle, the Hall output voltage measured 1.35 millivolts. The same probe, when subjected to a constant current of lesser magnitude, all other conditions being equal, yielded a Hall output voltage of 0.013 millivolt. In other words, by employing a pulsating current, the Hall output voltage was increased by a factor of one hundred. In addition, the sensitivity of the probe was greatly enhanced.

The frequency response of the probe alone is flat from D.C. to at least a 1 megapulse rate (within 1 decibel). The upper band width limit on the Hall effect in bismuth is estimated to be approximately $10^{10}$ to $10^{12}$ cycles per second. The present actual limitation is in the band width of the amplifier. Since the band width increases with lower gains in amplifiers, larger magnetic fields and larger probe currents will increase the frequency response of the system.

Instrumentation embodying an extremely high precision type of amplifier, having, say, a band width in the order of 100 megacycles, with a high resolution probe may yield a Hall output voltage of approximately 4.5 millivolts under conditions of applied pulsating currents of 5 amperes, a pulse repetition rate of 100 kilocycles, a pulse width of 100 millimicroseconds, and a low duty cycle of 0.1 of 1%.

The operating temperature of the probe for the measurement of data bit fields having intensities of the order of approximately 200 oersteds should be at approximately 70° F. with a tolerance of from 5° to 10° F. However, for more precise measurements of fields in the order of 0.5 to 2 oersteds, the temperature variation should be held to 0.1 of 1° F. For detection of the presence or absence of a data bit field, the temperature application range may be extended from −85° F. to 257° F. for materials such as indium arsenide.

An important limitation in the maximum repetition rate of current pulses is the power dissipation of the probe. This dissipation causes an increase in the temperature of the bismuth layer and a variation in sensitivity due to thermal drift. An upper temperature limit is that in which the probe is destroyed. A bismuth probe with resistance of 7 ohms was destroyed with a current of 1.75 amperes and a pulse width of 7 microseconds at a 200 cycle per second repetition rate; yielding an average power dissipation of 30 milliwatts. A typical usable limit for the same probe is a pulse current of 0.25 ampere, a pulse width of 1 microsecond, and a repetition rate of 47 kilopulses per second. If consideration is given in the design of the Hall probe to the temperature of the probe as a function of the mass of the active area, the heat sink for the probe, the probe current, the pulse width, and the thermal delay, then the repetition rate or the duty cycle may be increased. Increasing the mass of the active area (to increase the repetition rate) would decrease the resolution of the probe by the creation of a larger area. Further decrease in sensitivity would occur if the thicker probe were used due to reduction of the sensitivity of the probe.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for detecting magnetic field strength comprising a Hall probe; a pair of current carrying leads connected across an axis of said probe; a pair of voltage leads connected across a second axis of the probe, which axis is substantially perpendicular to the first axis, said voltage leads developing a Hall voltage when the probe is subjected to electric current and magnetic forces; and means for pulsating the current carried by said current leads to develop the Hall voltage across the voltage leads.

2. Apparatus for detecting magnetic field strength comprising a Hall probe; a pair of current carrying leads connected across an axis of said probe; a pair of voltage leads connected across a second axis of the probe, which axis is substantially perpendicular to the first axis, said voltage leads developing a Hall voltage when the probe is subjected to mutually perpendicular electric current and magnetic forces; and means for pulsating the current carried by said current leads to develop the Hall voltage across the voltage leads.

3. Apparatus for detecting magnetic field strength comprising a Hall probe; a pair of current carrying leads connected across an axis of said probe; a pair of voltage leads connected across a second axis of the probe, which axis is substantially perpendicular to the first axis, said voltage leads developing a Hall voltage when the probe is subjected to coincident and mutually perpendicular electric current and magnetic forces; and current driver means for pulsating the current carried by said current leads to develop the Hall voltage across the voltage leads.

4. Apparatus for detecting magnetic field strength comprising a Hall probe of the type having a thin layer of semiconductor material; a pair of current carrying leads connected across an axis of said thin layer; a pair of voltage leads connected across a second axis of said layer, which axis is substantially perpendicular to the first axis, said voltage leads developing a Hall voltage when said thin layer is subjected to electric current and magnetic forces; and means for pulsating the current carried by said current leads to develop the Hall voltage across the voltage leads.

5. Apparatus for detecting magnetic field strength comprising a Hall probe of the type having a cross-configured thin flat layer of semiconductor and in which the sensitive area of the probe lies at the intersection of the cross; a pair of current carrying leads connected across an axis of the cross-configured layer; a pair of voltage leads connected across a second axis of the cross-configured layer, which axis is substantially perpendicular to the first axis, said voltage leads developing a Hall voltage when the probe is subjected to electric current and magnetic forces; and pulse driver means for pulsating at the intersection the current carried by said current leads to develop the Hall voltage across the voltage leads.

6. Apparatus for detecting magnetic field strength comprising a Hall probe of the type having a cross-configured thin flat layer of semiconductor and in which the sensitive area of the probe lies at the intersection of the cross; a pair of current carrying leads connected across an axis of the cross-configured layer; a pair of voltage leads connected across a second axis of the cross-configured layer, which axis is substantially perpendicular to the first axis, said voltage leads developing a Hall voltage when the probe is subjected to electric current and magnetic forces; and pulse driver means for pulsating at the intersection the current carried by said current leads to develop the Hall voltage across the voltage leads, the pulsations being effected at a frequency and duty cycle commensurate with the stability of the semiconductor.

7. Apparatus for detecting magnetic field strength comprising a Hall probe of the type having a cross-configured thin flat layer of semiconductor and in which the sensitive area of the probe lies at the intersection of the cross; a pair of current carrying leads connected across an axis of the cross-configured layer; a pair of voltage leads connected across a second axis of the cross-configured layer, which axis is substantially perpendicular to the first axis, said voltage leads developing a Hall voltage when the probe is subjected to electric current and magnetic forces; a balancing network connected to said probe to suppress a noise component of voltage; and pulse driver means for pulsating at the intersection the current carried by said current leads to develop the Hall voltage across the voltage leads.

References Cited in the file of this patent

UNITED STATES PATENTS

| | | |
|---|---|---|
| 2,531,145 | Marco et al. | Nov. 21, 1950 |
| 2,633,019 | Albrecht et al. | Mar. 31, 1953 |
| 2,914,728 | Brophy et al. | Nov. 24, 1959 |